May 6, 1941.　　　　　W. L. BOND　　　　　2,240,685
CUTTING TOOL
Filed Dec. 15, 1937　　　　2 Sheets-Sheet 1

INVENTOR
W.L.BOND
BY
E.V. Griggs
ATTORNEY

May 6, 1941.     W. L. BOND     2,240,685
CUTTING TOOL
Filed Dec. 15, 1937     2 Sheets-Sheet 2
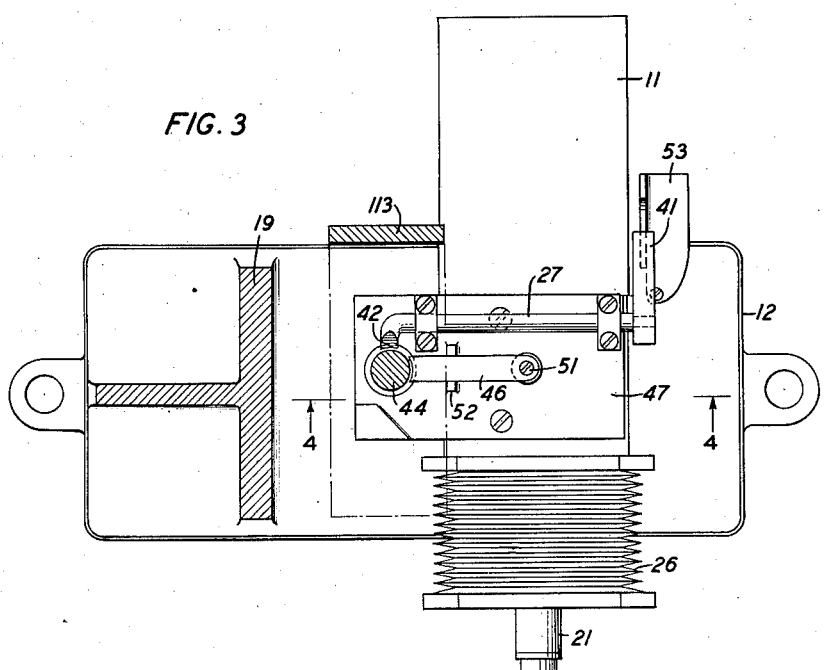
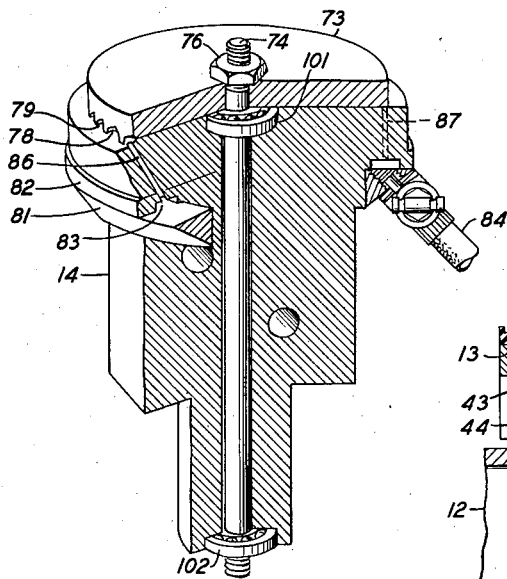
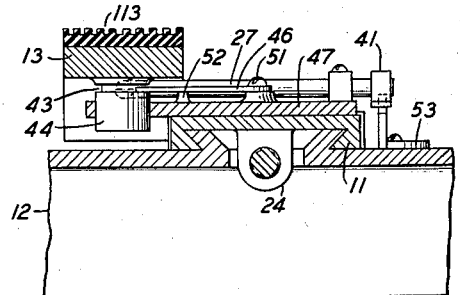
INVENTOR
W. L. BOND
BY
E. V. Griggs
ATTORNEY Patented May 6, 1941

2,240,685

UNITED STATES PATENT OFFICE 2,240,685

CUTTING TOOL

Walter L. Bond, New York, N. Y., assignor to Bell Telephone Laboratories, Incorporated, New York, N. Y., a corporation of New York Application December 15, 1937, Serial No. 179,959

5 Claims. (Cl. 90—25)

This invention relates to a cutting tool and particularly to a cutting tool for surfacing or "thinning down" Rochelle salt plates or other objects of similar material.

An object of the invention is to facilitate working Rochelle salt material.

A more specific object of the invention is to surface Rochelle salt plates rapidly and efficiently without breakage.

In the preparation of Rochelle salt plates, which have been commonly used for some time as piezoelectric elements in such electrical circuits as oscillators and wave filters and which have more recently been proposed for use in relays as disclosed for example in W. P. Mason Patent No. 2,166,763, issued July 18, 1939, "Piezoelectric apparatus and circuits," it is the usual practice to cut a number of relatively thin, substantially flat, plates or slabs from a larger crystal. As a rule these slabs, even when cut by means of the accurate and precise apparatus now available in modern shops, are not of the required thinness and in many cases the major surfaces do not present the high degree of plane parallelism required to give the plate the accurate characteristics demanded of it. It is generally necessary therefore to surface or grind down the plates in some manner after they have been cut from the larger crystal.

Various methods of thinning down the Rochelle salt plates have been tried none of which, in the experience of applicant's assignees, has proven entirely satisfactory. For example, the type of grinding plate commonly referred to as a lap has been used to a considerable extent with fair results. However, this is a relatively slow process and frequent breakage results. Edged cutting tools such as the common lathe and the planer have also been used but breakage has been excessive due to the fragility of the thin Rochelle salt plate. In the instance of use of the lathe breakage results from the stresses set up in the plate due to centrifugal force resulting from rotation thereof while in the instance of the planer the stresses set up in the plate when it is forcibly moved against the stationary cutting tool, are such that they cannot be withstood by the fragile plate.

Use of the surfacing tool of the present invention, however, involves none of the difficulties of previous methods and results in a rapid and efficient surfacing action. Here the plate remains substantially stationary so that all possible stresses due to motional effects are avoided, the only movement of the plate being that involved in slowly feeding it forward to bring the entire surface progressively into contact with the rapidly rotating cutting member. Factors believed to play a major part in the successful operation of the device are, first, the provision of a nicely balanced cutter and, second, the provision of means for rotating the cutter at a high rate of speed, of the order of 20,000 revolutions per minute. The precise balance of the cutter results from a very careful design of the entire rotor assembly and particularly from use of a specially shaped cutter arm and the use of a single compact cutting point capable of being balanced to an extent that would be difficult to achieve if a cutting element with a longer edge were used. Rotation of the cutter at the high rate of speed referred to results from the use of compressed air as a driving force.

Operation of the cutter arm at a relatively high rate of speed results in a rapid surfacing action, at the same time permitting an arrangement whereby only a minute portion of the material is removed by each rotation of the cutter. In view of this fact and the added fact that the cutter is adjusted to work on the uncut shoulder of the plate alone, substantially no stress is set up in the finished portion of the plate. The plate itself is not rotated so that stress due to centrifugal force is not set up the material.

For certain applications of the Rochelle salt plates, particularly when used in electric relays of the type disclosed in the Mason patent referred to above, it is desirable to leave a shoulder on the end of the thin plate.

In accordance with a feature of the present invention, special feeding mechanism is provided whereby a predetermined portion of the plate is left unground or is ground only slightly as compared to the rest of the plate, this predetermined portion being left as a mounting lug or shoulder for the plate.

In accordance with a further feature of the invention a particularly compact, easily assembled, inexpensive and efficient rotor assembly is provided.

Full understanding of the operation of the invention and of the various valuable features thereof may be gained from consideration of the following detailed description together with the annexed drawings in which:

Fig. 2 is an enlarged sectional view of a portion of the machine showing particularly the rotor assembly;

Fig. 3 is a plan view of the machine with the work-table and rotor assembly removed showing particularly the cam arrangement for shifting the position of the work-table;

Fig. 4 is a sectional view taken on line 4—4 of Fig. 3, the work-table being shown in place;

Figure 1:
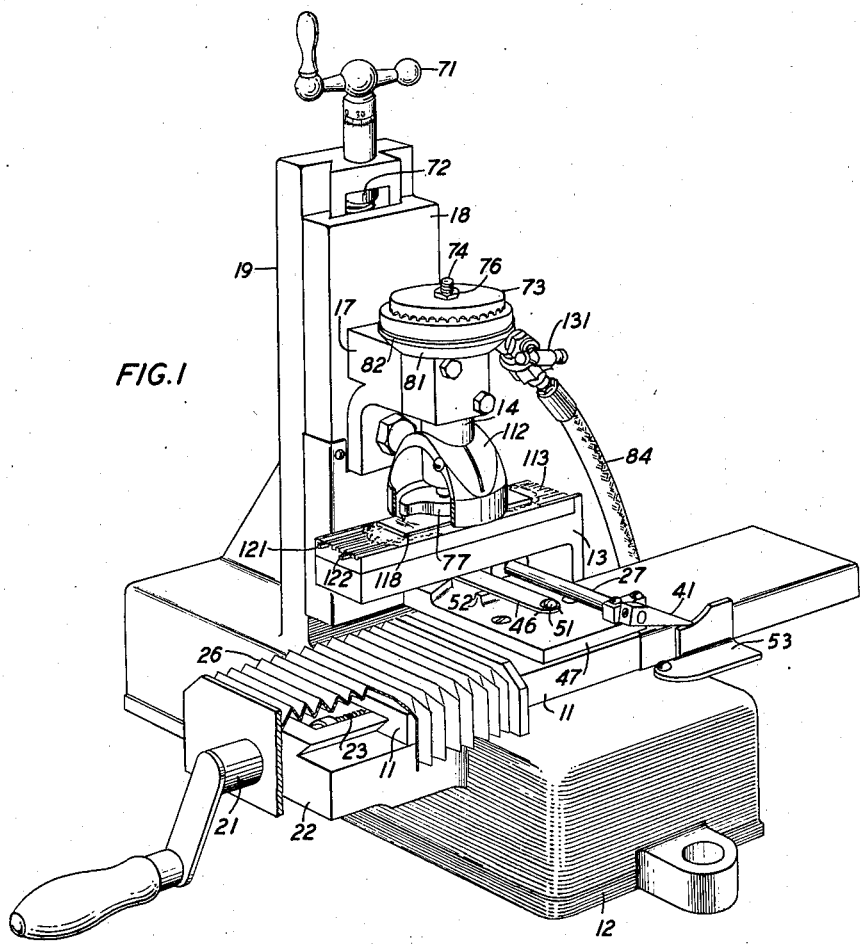
Fig. 1 is a view in perspective of a machine for surfacing Rochelle salt plates which embodies features of the present invention.

Referring now to Fig. 1, the surfacing machine comprises a reciprocating platform 11 supported on base 12. Work-table 13 is supported by and moves with platform 11. Rotor block 14 is supported by block 17, which, in turn, is mounted on plate 18, the latter being movable vertically on upright 19 of base 12.

Platform 11 may be moved forward or backward by rotation of crank 21 which is supported on extension 22 of base 12, this movement resulting from a driving connection between screw 23 (rotated by crank 21) and shoulder 24 (Fig. 4) carried by platform 11. Accordion pleated fibre guard 26 serves to protect the screw mechanism from dust.

Spindle 27, which is rotatably supported on platform 11, terminates at one end in cam finger 41 and at the other end in shoulder 42 (Fig. 3). Shoulder 42 is positioned in recess 43 (Fig. 4) provided in post 44 carried by work-table 13. One end of flat spring 46, which is attached to plate 47 by screw 51, is positioned in recess 43 also, the tension of spring 46 acting to normally hold work-table 13 in its raised position. The biasing force of spring 46 is increased by engagement of the spring with lug 52 (Fig. 4) of plate 47. As platform 11 is moved forward, the tip of cam finger 41 is, as shown in Fig. 1, brought into engagement with cam block 53 which is mounted on base 12 and, as the forward movement of platform 11 continues, spindle 27 is rotated in a counter-clockwise direction due to the camming action of block 53 on finger 41. In view of the engagement of shoulder 42 (Fig. 3) with the walls of recess 43, this rotation of spindle 27 results in work-table 13 being forced down to its lower position against the biasing action of spring 46. The purpose of this shift in the position of the work-table will be apparent from subsequent description of the operation of the machine.

The vertical position of the rotor assembly may be changed by rotation of crank arm 71 which, in turn, causes rotation of screw 72 and vertical movement of plate 18.

The rotor assembly consists of an air driven turbine plate 73 provided with a series of air receiving pockets, as 78 and 79, on the lower peripheral edge. This turbine plate is rotatably supported on rotor block 14 being held in position on shaft 74 by nut 76 (Fig. 2). Plate 73 is mechanically joined to shaft 74 so that rotation of the plate causes rotation of the shaft and of cutter arm 77 which is attached to the lower end of the shaft.

Ring 81 is positioned in contact with lip 82 of rotor block 14 and serves as a closure for passageway 83 provided in the lower surface of lip 82 thereby forming a substantially closed circumferential air chamber (Fig. 2). Air is admitted under high pressure to this chamber from supply pipe 84 and is directed against the edges of the air pockets in rotor plate 73 by a series of ducts, as 86 and 87, provided in lip 82. These ducts are drilled at a predetermined angle whereby the air jets strike the edges of the pockets at the exact points necessary for the most efficient application of power. In order to prevent vibration, shaft 74 is supported by rotor bearings 101 and 102.

Figure 5:
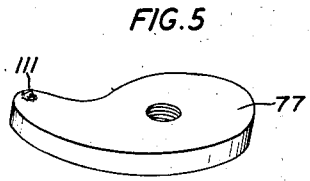
Fig. 5 is a view of the cutter arm shown in inverted position in order to disclose the cutting point more clearly.

Cutter arm 77 is attached to the lower end of shaft 74 by suitable means, for example, by a threaded connection. Cutting point 111 which is carried by arm 77 (Fig. 5) may comprise a diamond particle affixed in position on the arm by any suitable method. For example, the point may be held in place by an electro-deposited metal coating in accordance with the teachings of Broughton Patent 2,073,678 issued March 16, 1937. The cutter arm is carefully designed in order to assure exact balance, both static and dynamic, of the rotor assembly.

It will be apparent from the above that the rotor assembly provided is particularly compact and inexpensive and yet capable of unusually efficient operation. The unit is simple to assemble while obtaining the necessary static and dynamic balance of the rotating members is greatly facilitated due to the small number of moving parts involved.

A guard 112 is positioned on rotor block 14 and acts to protect the operator of the device from flying particles.

A hard rubber support 113 is carried by work-table 13, grooves which assist in retaining the work in place being provided in the support. The hard rubber base acts to prevent a rapid transfer of heat from the work to metal table 13 thereby playing a valuable part in preventing breakage of the work.

Figure 6:
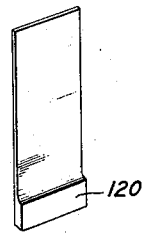
Fig. 6 is a view in perspective of a Rochelle salt plate after having been surfaced by the machine illustrated.

In order to further describe the machine let us assume that it be desired to thin down Rochelle salt plate 118 in order to produce a plate of the nature used in piezoelectric relays, such a plate being shown in Fig. 6. As shown in Fig. 6, an enlarged portion or shoulder 120 is left on the end of the plate for mounting purposes.

At the start of the process the rotor assembly is raised slightly by rotation of crank 71 and the work-table assembly is brought to its starting position by rotation of crank 21. The Rochelle salt plate 118 which is to be surfaced is then mounted in position on work support 113 being held in place thereon by suitable means, for example by the use of an adhesive. Blocks such as 121 and 122 may be inserted in certain of the grooves provided in support 113 in order to prevent flow of the adhesive and possible consequent movement of plate 118. The rotor assembly is then lowered by rotation of crank 71 until cutting point 111 is at the proper level to contact the surface of plate 118 when rotated. Pressure control valve 131 is now opened admitting air under pressure into chamber 83 which results in rotation of shaft 74, and cutter arm 77 carried thereby, at a high rate of speed of the order of 20,000 revolutions per minute.

The work-table assembly is now fed forward by rotation of crank 21 so that the entire surface of plate 118 from end to end is progressively brought into contact with rapidly rotating cutting point 111. In view of the rapid rate at which the cutting point is rotated, the work may be fed forward fairly rapidly without resulting in removal of more than a minute portion of the surface by each rotation of the cutting point. While it has been found necessary, in order to prevent fracture of the fragile plate, to remove only a minute portion of the previously uncut surface of the plate by each rotation of the cutter it is, at the same time, desirable from the standpoint of economical production that a fairly rapid feeding action be utilized.

In view of the careful design of, and the supporting arrangement provided for, the entire rotor assembly, substantially no vibration of the cutting tool occurs even though it is driven at the high rate of speed necessary for the successful operation of the tool. No small part in the elimination of vibration is played by the design of the cutting element itself and the cutter arm which carries it; the cutter arm is specially shaped to achieve static and dynamic balance of the assembly while the use of the single short cutting point, instead of a longer blade, facilitates balancing the unit.

As platform 11 is fed forward to the position illustrated in Fig. 1, the tip of cam finger 41 engages the cam edge of block 53 and as forward movement of the platform continues, spindle 27 is rotated and causes work-table 13 to be lowered slightly in the manner described above. This means, of course, that plate 118 is moved away from cutting point 111 so that the remaining surface of the plate is not ground, or is ground only slightly, the result being that a relatively thick shoulder (corresponding to shoulder 120 of Fig. 6) remains on the end of plate 118. As explained above, this shoulder serves as a means for mounting the plate.

Upon completion of the cut the plate, if of the required thinness, is removed from work support 113. If further working is desirable, platform 11 is returned to starting position by rotation of crank 21, the position of the cutter assembly is properly adjusted and the thinning process described above is repeated.

While a specific embodiment of the invention has been selected for detailed description, the invention is not, of course, so limited in its application. The embodiment described should be taken as illustrative of the invention and not as restrictive thereof.

What is claimed is:

1. In a tool for surfacing Rochelle salt plates, a base, a horizontally movable platform supported by said base, means for moving said platform horizontally, a work-table supported by said platform, said table being capable of vertical movement within relatively narrow limits from a raised position to a lowered position, a projection on said work-table having a recess therein, a spring member attached to said platform, one end of said spring member engaging in said recess, the biasing action of said spring member being effective to normally hold said work-table in raised position, a spindle rotatably supported on said platform, a shoulder on one end of said spindle and a cam engaging finger on the other end thereof, said shoulder engaging the recess in said projection, a cam block on said base in position to be engaged by said cam engaging finger at a predetermined point in the horizontal movement of said platform, engagement of said finger and said cam block being effective upon continued horizontal movement of said platform to cause rotation of said spindle, rotation of said spindle being effective to move said work-table to lowered position, a rotatable cutter arm, means for supporting said cutter arm in operative position with respect to said work-table, and means for rotating said cutter arm.

2. In a tool for surfacing Rochelle salt plates, a base, a horizontally movable platform supported by said base, means for moving said platform horizontally, a work-table supported by said platform, a work supporting plate on said table, said plate being of a material which is relatively slow to conduct heat and having a plurality of parallel grooves therein, closure members positioned in certain of said grooves, said table being capable of vertical movement within relatively narrow limits from a raised position to a lowered position, a projection on said work-table having a recess therein, a spring member attached to said platform, one end of said spring member engaging in said recess, the biasing action of said spring member being effective to normally hold said work-table in raised position, a spindle rotatably supported on said platform, a shoulder on one end of said spindle and a cam engaging finger on the other end thereof, said shoulder engaging the recess in said projection, a cam block on said base in position to be engaged by said cam engaging finger at a predetermined point in the horizontal movement of said platform, engagement of said finger and said cam block being effective upon continued horizontal movement of said platform to cause rotation of said spindle, rotation of said spindle being effective to move said work-table to lowered position, a rotatable cutter arm, means for supporting said cutter arm in operative position with respect to said work-table, and means for rotating said cutter arm.

3. In a tool for surfacing fragile material, a rotatable shaft, means for rotating said shaft at a speed of the order of 20,000 revolutions per minute, a cutter arm attached to said shaft and rotatable therewith, the point of attachment of said shaft being midway between the ends of said arm, and a single relatively short cutter point attached to one end of said arm, said arm being so shaped that the mass of one end of the arm is greater than the mass of that end of the arm at which said cutter point is attached by an amount sufficient to bring about static and dynamic balance of said shaft and arm.

4. A balanced tool for rotary operation at speeds of the order of several thousand revolutions per minute comprising a flat plate, a single relatively short cutter point mounted at one end of said plate, and means for mounting said plate to rotate in a plane parallel to one of its principal flat faces, the material of the plate being so distributed about the axis of rotation and the plate being so shaped that the mass of that end of said plate at which said cutter point is mounted is less than the mass of the opposite end of the plate by an amount sufficient to bring about both a static balance and a dynamic balance of the plate at high speed.

5. In a tool for surfacing fragile material, a base, a horizontally movable platform supported by said base, means for moving said platform horizontally, a work-table supported by said platform and movable therewith, a rotatable cutter arm, a cutting point on said arm, means for rotating said cutting arm at a speed of the order of 20,000 revolutions per minute, a protective guard surrounding said cutter arm and rotatable therewith, means for supporting said cutter arm from said base in a position overhanging said work-table, and means effective upon said platform reaching a predetermined point in its horizontal movement for increasing by a relatively small amount the vertical distance between said cutter arm and said work-table.

WALTER L. BOND.